United States Patent [19]

Mutschler, Jr.

[11] Patent Number: 5,720,452
[45] Date of Patent: Feb. 24, 1998

[54] SOLAR PANEL PARALLEL MOUNTING CONFIGURATION

[75] Inventor: Edward Charles Mutschler, Jr., Wexford, Pa.

[73] Assignee: Lockheed Martin Corporation, East Windsor, N.J.

[21] Appl. No.: 655,110

[22] Filed: May 29, 1996

[51] Int. Cl.[6] .............................. B64G 1/44; H02N 6/00
[52] U.S. Cl. ........................ 244/173; 136/245; 136/292
[58] Field of Search ............................. 244/158 R, 164, 244/173; 136/245, 292

[56] References Cited

U.S. PATENT DOCUMENTS

| | | |
|---|---|---|
| 4,325,124 | 4/1982 | Renner . |
| 4,394,529 | 7/1983 | Gounder ............................ 136/245 |
| 4,588,151 | 5/1986 | Mori ................................. 244/173 |
| 4,630,791 | 12/1986 | Chapman ......................... 244/173 |
| 4,690,355 | 9/1987 | Hornung et al. ................. 244/173 |
| 5,098,042 | 3/1992 | Viale ................................. 244/173 |
| 5,196,857 | 3/1993 | Chiappetta et al. . |
| 5,211,360 | 5/1993 | Zimbelman ...................... 244/164 |
| 5,228,644 | 7/1993 | Garriott et al. ................ 24/158 R X |
| 5,344,104 | 9/1994 | Homer et al. .................... 244/158 R |

*Primary Examiner*—William Grant
*Attorney, Agent, or Firm*—W. H. Meise; C. A. Berard; S. A. Young

[57] ABSTRACT

A spacecraft includes a plurality of solar panels interconnected with a power coupler and an electrically operated device to provide power to the device when the solar cells are insolated. The solar panels are subject to bending distortion when entering or leaving eclipse. Spacecraft attitude disturbances are reduced by mounting each of the solar panels to an elongated boom made from a material with a low coefficient of thermal expansion, so that the bending of one panel is not communicated to the next. The boom may be insulated to reduce its bending during changes in insolation. A particularly advantageous embodiment mounts each panel to the boom with a single mounting, which may be a hinge. The single mounting prevents transfer of bending moments from the panel to the boom.

9 Claims, 8 Drawing Sheets

SOLAR PANEL PARALLEL MOUNTING CONFIGURATION

The invention described herein was made in the performance of work under NASA Contract No. NAS5-32315 and is subject to the provisions of Section 305 of the National Aeronautics and Space Act of 1958 (42 U.S.C. 2457).

FIELD OF THE INVENTION

This invention relates to prevention of attitude errors in spacecraft which move into and from eclipse, and more particularly to reduction of attitude errors caused by deployable array thermal effects.

BACKGROUND OF THE INVENTION

Spacecraft or satellites are now widely used for many purposes, including communications. Communications spacecraft are provided with numerous antennas and signal processing devices for receiving transmissions from earth stations, and for retransmitting the information in the signals so received to other earth stations. As the number and quality of the information channels which must be handled, and the directivity of the retransmissions, is increased, the dimensions of the solar collectors or sunlight-to-electric converters required to power the signal processors and transmitters increase, and the dimensions of the transmitting and receiving antennas also tend to increase.

Solar collectors are generally configured as arrays of semiconductor cells, each of which produces a small amount of electrical energy when insolated or illuminated by the sun. Multitudes of such cells are interconnected in series-parallel configurations to provide solar array output voltages which are a multiple of the voltage of an individual solar cell, and with current capability sufficient to satisfy the demand of the communications equipment load. The solar cell area required for a modern spacecraft may exceed one hundred square feet. The well-known weight constraints on spacecraft are such that the solar cells must be supported in the arrays with minimal weight, so they are generally supported by lightweight honeycomb panels made from some lightweight material, such as aluminum. Another well-known constraint of spacecraft is that the launch vehicles have limited volume payload chambers, and that the chambers have relatively small linear dimensions. In order to fit a solar panel having a surface area of a hundred square feet or more into the small payload chamber of a launch vehicle, it is common to make the solar collector in the form of a plurality of similarly-dimensioned panels, each with linear dimensions which will fit within the payload chamber of the launch vehicle. These solar panels, each supporting hundreds, if not thousands, of individual solar cells, are electrically interconnected so that the combination of the panels produces the desired output. The panels are mechanically stacked against each other in a stowed condition, so that they take up minimal volume during launch, and are then deployed into a coplanar array when the spacecraft arrives on-station. Many clever schemes for deploying the panels have been described. U.S. Pat. No. 5,196,857, issued Mar. 23, 1993 in the name of Chiappetta et al. describes a stowable and deployable panel system which may be used for supporting solar cell arrays or antenna arrays, and also describes a spring hinge arrangement which provides the energy for unfurling the panel system, and stiffening the deployed panels.

One prior-art solar collector scheme uses a flexible "sheet" solar collector, which can be stowed by rolling, much like a rug. This flexible sheet approach has the disadvantage of being expensive, and the further disadvantage that some scheme must be provided to hold it in the desired deployed shape.

Figure 1:
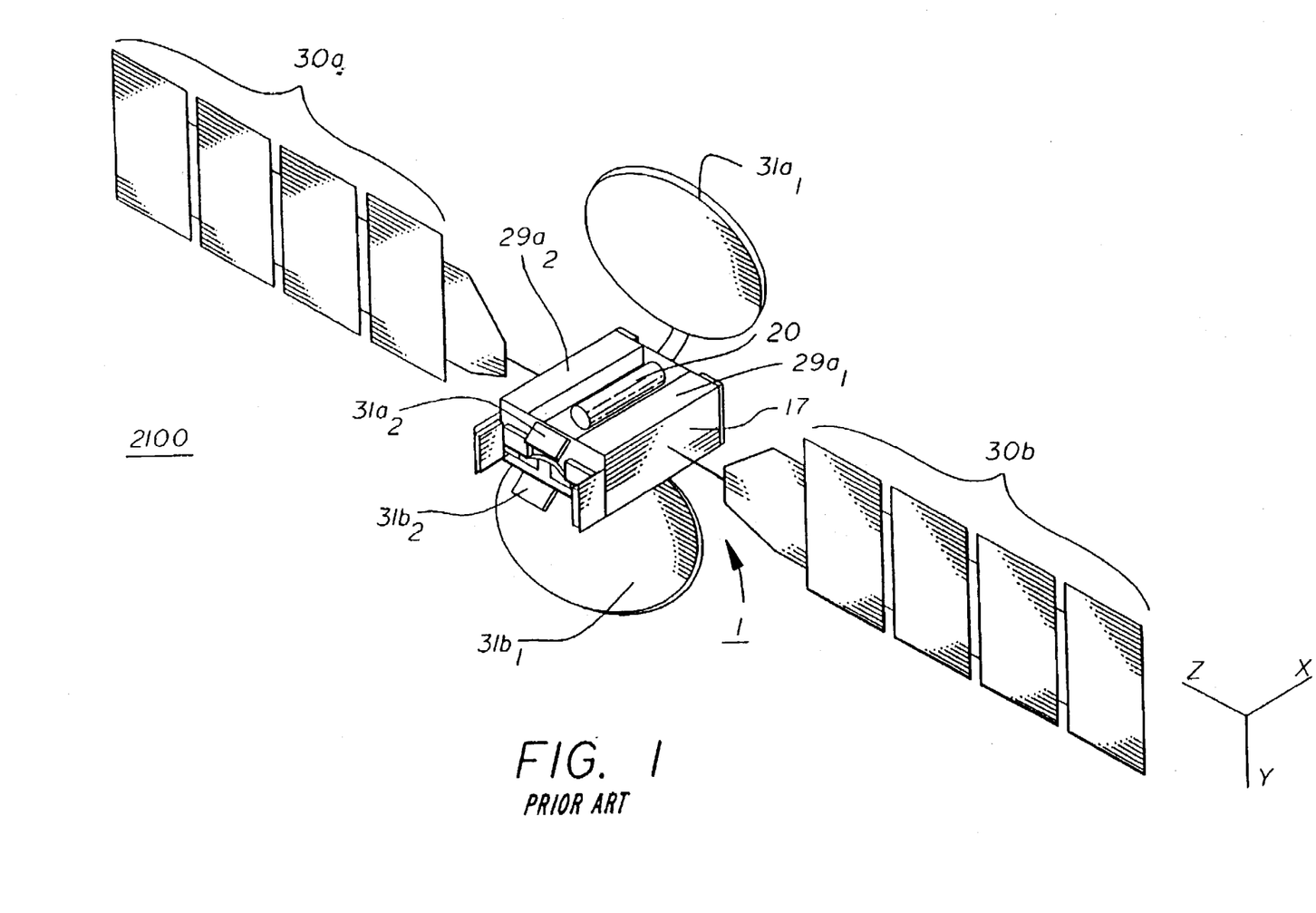
FIG. 1 is a simplified perspective or isometric view of a prior-art spacecraft arrangement, illustrating an edge-to-edge connection of solar panels.

In another scheme for a solar collector, the solar cells are mounted on a plurality of substantially identical support panels. The edge of each support panel is hinged to an edge of the adjacent panel. The first panel, which is closest to the spacecraft, is hinged to the body of the spacecraft. In the deployed condition, the panels are connected edge-to-edge, as illustrated by panels 30a and 30b in FIG. 1, and as illustrated in U.S. Pat. No. 5,344,104, issued Sep. 6, 1994 in the name of Homer et al. In FIG. 1, a spacecraft is designated generally as 2100, and includes unfurled four-section solar panels designated 30a and 30b, a body designated 1, including access panels 29a1 and 29a2, an oxidizer tank 20, a first antenna system including a dual-polarization reflector 31a1 and its feed 31a2, and a second reflector 31b1 and its feed 31b2. In the stowed condition, the panels are accordioned together, much as continuous computer paper is stacked, to form a flat stack lying "against" the body of the spacecraft. In actuality, the panel surfaces which bear the solar cells may not actually touch an adjacent structure, in order to prevent damage to the solar cells.

Spacecraft used for communications, and which provide high signal-to-noise performance, often do so by using highly directive antennas, or antennas which have precisely directed radiation patterns, so that the signals arriving at the desired destination are at the highest possible amplitude. This requirement, in turn, places stringent requirements on the attitude control system of the spacecraft. Attitude control systems have been steadily improving, and are now routinely expected to maintain the desired pointing of the antennas to within a small angle, possibly less than one degree. The solar collector arrangement as illustrated in the Homer et al. patent, when used for large solar collectors for powering new, high-performance spacecraft, tends to adversely affect the pointing performance of the spacecraft, due to its resonances, and also due to transient effects which occur when the insolation of the array changes, as may occur during a transition between daylight and shadow or night.

Improved spacecraft pointing performance is desired.

SUMMARY OF THE INVENTION

A spacecraft according to an aspect of the invention includes a body, and an electrically powered device, such as a signal processor or amplifier, associated with the body. A power coupler arrangement includes input terminals for accepting electrical energy, and is coupled to the electrically powered device, for coupling electrical energy from the input terminals of the power coupler arrangement to the electrically powered device for energization thereof. First and second solar panels each include at least one power converter for converting insolation energy into electrical energy, and also include terminals interconnected with the input terminals of the power coupler arrangement for coupling electrical energy from the solar panels to the power coupler arrangement during those intervals in which the solar panels are insolated. Deployable solar panel supporters are coupled to the body, the solar panel supporters include at least first and second elongated beams, and each of the first and second elongated beams includes first and second ends, with the first end of the first elongated beam being affixed to the body in a manner which allows the first elongated beam to be located adjacent to other structure of the spacecraft in a stowed condition of the first elongated beam, and the second end of the first elongated beam being coupled to the first end of the second elongated beam in a manner which allows the second elongated beam to be located adjacent to other structure of the spacecraft in a stowed condition of the second elongated beam. The first and second elongated beams are deployable from the stowed condition to a deployed condition, in which deployed condition the first and second elongated beams are at least approximately in-line or mutually parallel. The first and second elongated beams of the deployable solar panel supporters are also mechanically coupled to the first and second solar panels, respectively, for, in the deployed state, supporting the first and second panels in an array in which the panels are substantially parallel. In this arrangement, deformation of the first panel attributable to thermal effects of the insolation does not affect the deployed orientation of the second panel. The power coupler arrangement includes a power conditioner, in one embodiment of the invention, for controlling either the voltage or the current, or both, of the electrical energy. In a particular embodiment, each of the first and second solar panels includes positive and negative terminals at which positive and negative direct voltages are generated by the solar panels during the insolation, and the interconnection with the input terminals of the power coupler arrangement includes (a) a connection between the positive terminal of the first solar panel and a first one of the input terminals of the power coupler arrangement, (b) a connection between the negative terminal of the second solar panel and a second one of the input terminals of the power coupler arrangement, and (c) series connection arrangement coupled to the negative terminal of the first solar panel and to the positive terminal of the second solar panel, for connecting the first and second solar panels in electrical series to thereby increase the voltage available from the solar panels to the power coupler arrangement. The array series connection arrangement may include solar panels other than the first and second solar panel. The power coupler arrangement includes an arrangement for coupling at least some of the solar panels in an electrical series-parallel connection, for thereby providing a total voltage from the array which is greater than the voltage available from a single one of the solar panels, and also providing the capability of current greater than the current which is available from a single one of the solar panels. In one embodiment, the first elongated beam is mechanically coupled to the first solar panel at a single position along the length of the first elongated beam, whereby any tendency of the first solar panel to bend is not communicated to the first elongated beam, or to other panels along the length of the combined beams. The first and second solar panels may be supported on support panels made of a material having a coefficient of thermal expansion (CTE) which is less than that of the material of the first and second elongated beams. The material of the beams may be graphite-reinforced cyanate ester. The material of the support panels may include aluminum structural members.

DESCRIPTION OF THE INVENTION

Figure 2A:
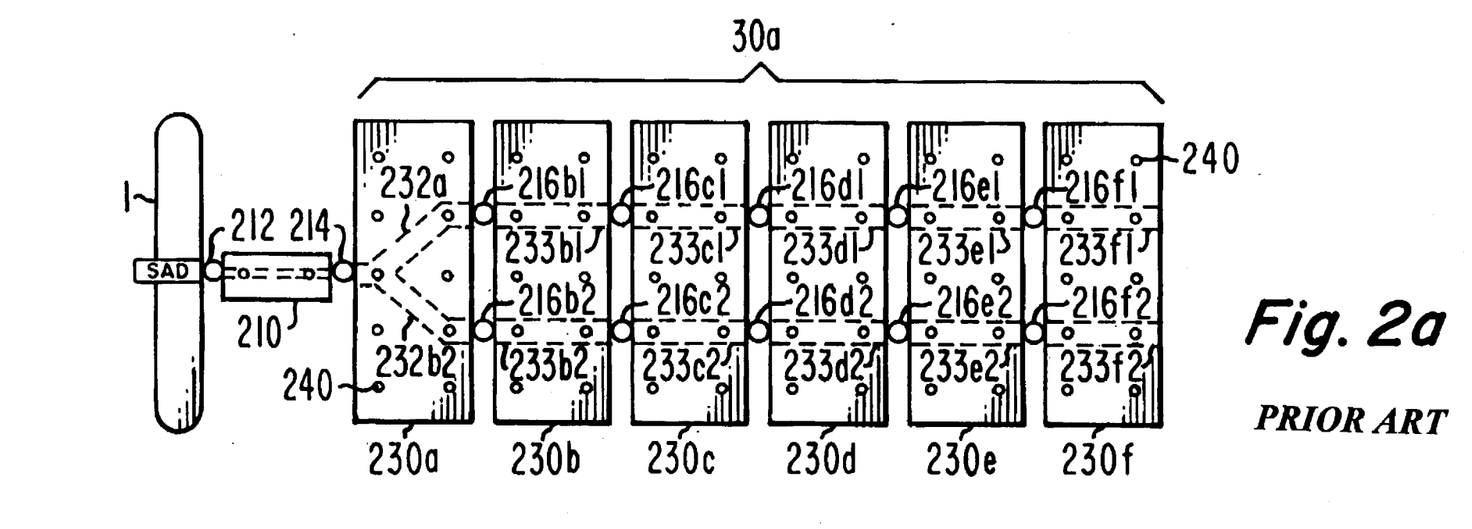
FIG. 2a is a simplified plan view of a spacecraft with a prior-art edge-connected solar panel array.

FIG. 2a is a plan view of the spacecraft body 1 and solar array 30a of FIG. 1. In FIG. 2a, a support member 210 is affixed to body 1 by a hinge 212. Solar collector array 30a includes six solar panels 230a, 230b, 230c, 230d, 230e, and 230f. Spacecraft solar panel 230a has a Y-shaped internal stiffening member including branches 232a and 232b spaced apart by about one-half the principal dimension or length of the panel. The remaining panels 230b, 230c, 230d, 230e, and 230f each include a pair of internal stiffeners 233b1, 233b2; 233c1, 233c2, 233d1, 233d2, 233e1, 233e2; 233f1, 233f2, respectively, which are spaced apart by the same dimension. The junction of the "Y" stiffener branches 232a, 232b of panel 230 is connected by a hinge 214 to the end of support member 210 which is remote from spacecraft body 1, which is the right end of member 210 in FIG. 2a.

Figure 2B:
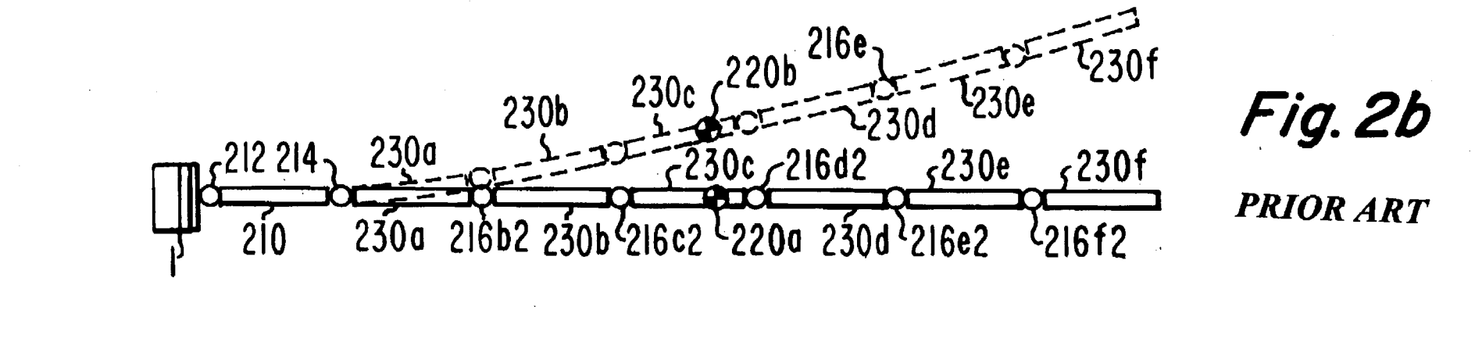
FIG. 2b is a simplified edge view of the spacecraft and solar panel of FIG. 2a, illustrating mechanical changes attributable to bending of a single panel due to insolation.

In FIG. 2a, the left edge of panel 230b is connected by hinges 216b1 and 216b2 to the right edge of panel 230a, with the hinges being located at the ends of the stiffeners. More particularly, hinge 216b1 is connected to panels 230a and 230b at the facing ends of stiffeners 232a and 233b1, respectively, and hinge 216b2 is connected to panels 230a and 230b at the facing ends of stiffeners 232b and 233b2, respectively. Similarly, the left edge of panel 230c is connected by hinges 216c1 and 216c2 to the right edge of panel 230b, with the hinges being located at the facing ends of the stiffeners; more particularly, hinge 216c1 is connected to panels 230b and 230c at the facing ends of stiffeners 233b1 and 233c1, respectively, and hinge 216c2 is connected to panels 230b and 230c at the facing ends of stiffeners 233b2 and 233c2, respectively. The left edge of panel 230d is connected by hinges 216d1 and 216d2 to the right edge of panel 230c, with the hinges being located at the facing ends of stiffeners 233c1 and 233d1; 233c2 and 233d2. Panel 230e is connected by hinges 216e1 and 216e2 to panel 230d, with the hinges 216e1 and 216e2 located at the facing ends of stiffeners 233d1 and 233e1; 233d2 and 233e2. Panel 230f is connected by hinges 216f1 and 216f2 to panel 230e, with the hinges 216f1 and 216f2 located at the facing ends of stiffeners 233e1 and 233f1; 233e2 and 233f2. In FIG. 2b, the circular symbols, some of which are designated 240, represent through apertures which allow passage of retaining cables for retaining the panels in the stowed position.

FIG. 2b is a side or edge view of the array of solar panels of FIG. 2a. In FIG. 2b, sets of two hinges, such as the set including hinges 216c1 and 216c2 are seen as only one hinge because 216c1 is hidden behind 216c2. The solid-line portion of the array of FIG. 2b represents the ideal or undistorted shape of the array, namely straight line, corresponding to a coplanar condition of the associated panels 230a, 230b, 230c, 230d, 230e, and 230f. The dash-line or phantom view illustrates in exaggerated form what happens when one of the panels, in this case panel 230a, is distorted into a curve, as might occur if the panel were temperature-sensitive, and was subjected to a sudden influx of solar energy from one side. Such an effect occurs because that side of the panel which faces the insolation tends to heat and therefore to expand, with the result that the panel tends to curve, much like a bimetallic strip does in the presence of heat. It should be emphasized that this bending takes place in two planes, and only the bending in a single plane is visible in FIG. 2b.

The effect of a sudden entry of the spacecraft solar panel into sunlight or into eclipse is to cause a tendency for all of the solar panels to bend at the same time. This bending, in turn, causes portions of the solar panel array which are at the end most remote or most distant from the body of the spacecraft to move along an arc. For example, a center of mass designated 220a in FIG. 2b can be seen to move to a location 220b, which is a shorter distance than that moved by the tip or most remote end of the solar panel. This relatively sudden bending when entering or exiting eclipse is an actual movement of a relatively large component of the mass of the spacecraft, which tends to perturb or disrupt the spacecraft attitude.

The attitude control system of the spacecraft is a feedback system which urges the spacecraft toward the desired attitude, but the transient response of such a feedback system tends to be slow, and may not be able to compensate for the sudden "thermal snap" of the solar panel, although it will, over time, return the attitude to that desired. However, a geosynchronous spacecraft enters or leaves eclipse twice daily, with the effect that there is a possible tendency for relatively frequent transient attitude errors. Such attitude errors are undesirable, because they adversely affect the pointing of the spacecraft antennas, and therefore have a tendency to reduce the signal-to-noise ratio (SNR) near the edges of the antenna's coverage area.

Figure 3A:
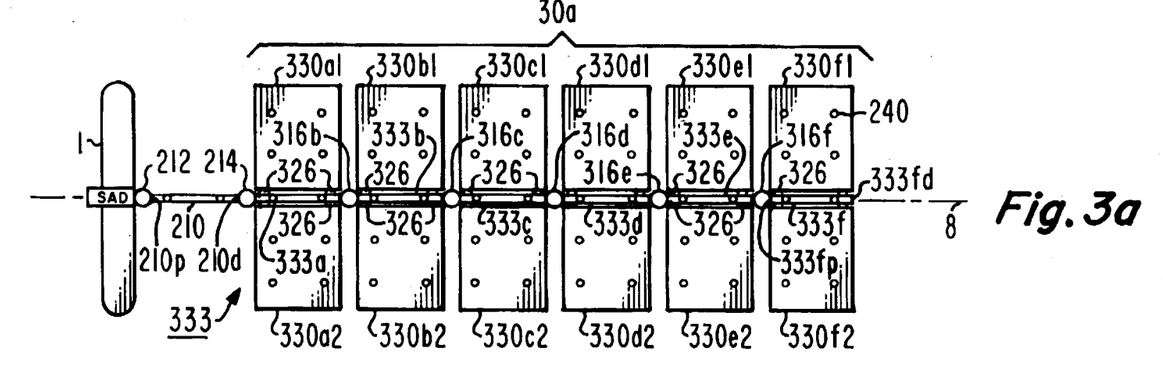
FIG. 3a is a simplified plan view of a spacecraft with solar panels according to an aspect of the invention.

FIG. 3a is a simplified plan view of a spacecraft including a solar panel according to the invention. In FIG. 3a, spacecraft body 1, is connected at a hinge 212 to a proximal end 210p of first support beam 210, and beam 210 is affixed by a hinge 214 at its distal end 210d to the proximal end of a further elongated section 333a of an extended support beam 333. For simplicity, the support beam sections are themselves referred to as "support beams" herein. The distal end of support beam 333a is connected at its distal end to the proximal end of a further support beam 333b by a hinge 316b. The distal end of support beam 333b is connected to the proximal end of a further support beam 333c by a hinge 316c, and the distal end of support beam 333c is connected to the proximal end of a further support beam 333d by a hinge 316d. The distal end of support beam 333d is connected to the proximal end of a further support beam 333e by a hinge 316e, and the distal end of support beam 333e is connected to the proximal end of a further support beam 333f by a hinge 316f. The elongated beams 333a, 333b, 333c, 333d, 333e, and 333f are preferably made from a material with a relatively low coefficient of thermal expansion (CTE), such as graphite-impregnated cyanate ester, so that the bending of the beams in their deployed state will be minimal. Also, the beams are preferably insulated in a manner selected to minimize heat absorption during insolation. Such insulation may include batts placed about the support beams at locations far from the hinges, with tape insulation wound about the beams in the regions near the hinges, to thereby prevent errant portions of the batts from interfering with hinge deployment.

The individual solar panels making up the array of solar panels includes panels 330a1, 330b1, 330c1, 330d1, 330e1, and 330f1 lying above the array of deployed support beams 333a, 333b, 333c, 333d, 333e, and 333f as seen in FIG. 3a. A further set of solar panels 330a2, 330b2, 330c2, 330d2, 330e2, and 330f2 lies below the deployed support beams. Each of the solar panels of the upper and lower sets is individually affixed by a support, some of which are designated 326, to the associated one of the support beams. More particularly, solar panels 330a1 and 330a2 are both individually affixed to support beam 333a, solar panels 330b1 and 330b2 are both individually affixed to support beam 333b, solar panels 330c1 and 330c2 are both individually affixed to support beam 333c, solar panels 330d1 and 330d2 are both individually affixed to support beam 333d, solar panels 330e1 and 330e2 are both individually affixed to support beam 333e, and solar panels 330f1 and 330f2 are both individually affixed to support beam 333f. Instead of rigidly affixing the panels to the support beams by means of supports 326, the supports 326 may instead be hinges. This hinging of the support beams together with the hinging of the panels to the support beams allows the panels to be stowed in a chamber having relatively small linear dimensions.

Figure 3B:
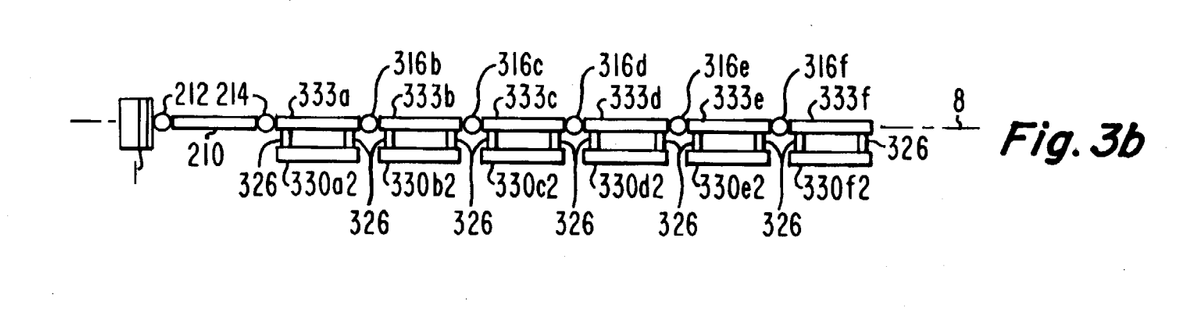
FIG. 3b is a side or elevation view of the structure of FIG. 3a, somewhat distorted to better show certain connections.

FIG. 3b is a simplified side view of the arrangement of FIG. 3a, with the planes in which the panels are located purposely displaced to a location below their actual locations, so that the panel supports can be better illustrated. In actuality, the plane in which the panels 330a, 330b, 330c, 330d, 330e, and 330f are located passes through the center axis 8 of the extended beams 333a, 333b, 333c, 333d, 333e, and 333f. This arrangement supports the most distal panels, such as panel 330f1, by means of an extended beam having a relatively small temperature coefficient, which, as mentioned, may be further protected from direct radiation. Thus, the extended support beam 333 has little inherent tendency to bend during the change in temperature when entering or leaving eclipse. It will be noted from FIG. 3b that, even though the support beam 333 does not itself tend to bend as a result of insolation changes, the solar panels to which it is connected do have such a tendency, as their large, planar construction necessarily allows large amounts of insolation, and possibly because structural considerations require the use of materials having a larger coefficient of thermal expansion.

Figure 3C:
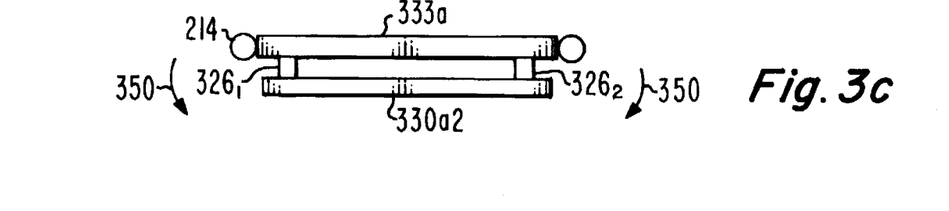
FIG. 3c is a detail of the arrangement of FIG. 3b.

In FIG. 3c, panel 330a2 is taken as being representative of any panel of the structure of FIG. 3a. As illustrated by arrows 350 in FIG. 3c, the tendency of panel 330a2 to bend can be communicated to its support beam 333a by way of supports $326_1$ and $326_2$. In addition to panel 330a2 which is illustrated in FIG. 3c, there is another panel similarly connected, namely panel 330a1. Thus, the bending tendency or forces of two panels act to impart a bending moment to support beam 333a, and is resisted only by the stiffness of the support beam.

Figure 4:
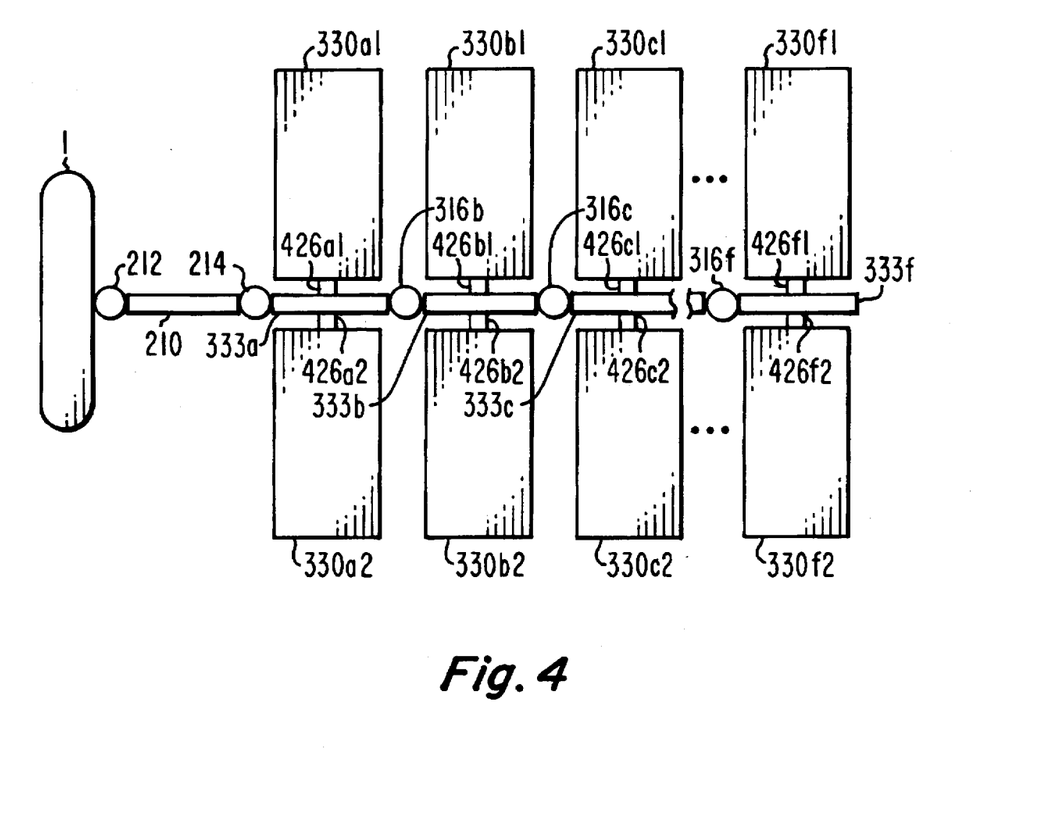
FIG. 4 is a simplified plan view of an embodiment of the invention similar to that of FIG. 3a, with a single support for each panel.

According to another aspect of the invention, the need for a support beam which is very stiff, and therefore large and bulky, in order to resist the bending moments 350 imparted by the solar panel(s) attached thereto, is ameliorated by using an attachment which is located at a single transverse location along the support beam. In FIG. 4, elements corresponding to those of FIG. 3 are designated by like reference numerals. In FIG. 4, each panel 330 is mechanically coupled to its supporting beam 333 by a single coupler or fastener 426. For example, panel 330a1 is coupled by a fastener 426a1 to support beam 333a, panel 330a2 is coupled by a fastener 426a2 to support beam 333a, panel 330b1 is coupled by a fastener 426b1 to support beam 333b, panel 330b2 is coupled by a fastener 426b2 to support beam 333b, . . ., panel 330f1 is coupled by a fastener 426f1 to support beam 333f, and panel 330f2 is coupled by a fastener 426f2 to support beam 333f. Since each panel is connected to its associated support beam by only one fastener, bending of the panel due to temperature changes cannot apply a moment to the support beam, which therefore cannot flex in response to bending of the panel. The support beam, with such singular connections, bends only as much as the insolation which it receives acts on its own coefficient of thermal expansion.

According to an aspect of the invention, the support beam sections 333 are made from a material with a low coefficient of thermal expansion, such as graphite-impregnated or graphite-reinforced cyanate ester. According to one mode of using the invention, the beam is thermally insulated to reduce the effects of insolation. The thermal insulation may take the form of batts applied to the main portion of each beam section, and insulating tape wound about the beam section in the region of the hinges. The thermal insulation tends to reflect insolation, as known to those skilled in the art, and, even though the outside temperature of the insulation may rise due to unavoidable absorption of solar energy, the insulation tends to allow heat to be transferred to the underlying beam only slowly, so that temperature changes tend to be averaged over time. The use of insulation to reduce the temperature changes to which the support beam or support beam sections are exposed, together with the use of low-coefficient beam materials, tends to reduce the amount of bending introduced by the beam sections themselves. This allows the deployment of relatively large arrays of solar panels (or antennas) without excessive flexing of the deployed panels, and without the relatively large change in the effective location of the center of mass of the deployed array. The lack of a large change in the effective center of mass of the deployed array, in turn, tends to reduce adverse effects on the spacecraft attitude.

Figure 5:
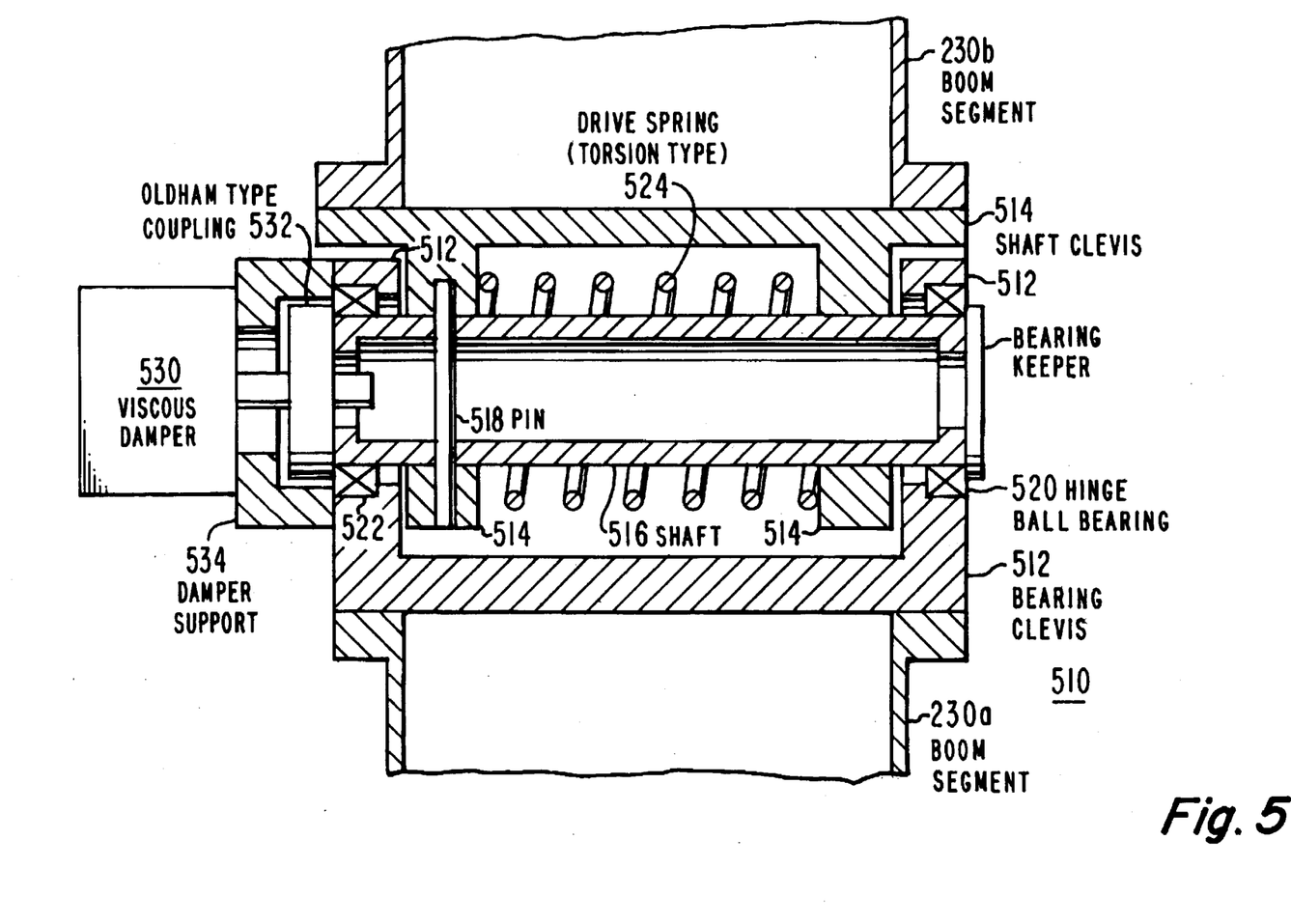
FIG. 5 is a cross-sectional representation of a hinge which may be used in the arrangement of FIGS. 3a or 4.

FIG. 5 illustrates a hinge 510 which may be used in the arrangement of FIGS. 3a, 3b, 3c and 4. In FIG. 5, hinge 510 is representative of any hinge in the arrangement of FIGS. 3a, 3b, 3c and 4. For definiteness, hinge 510 is illustrated as being coupled between beam sections 230a and 230b. Hinge 510 of FIG. 5 includes a bearing clevis 512 which is affixed to beam section 230a, and a further clevis 514 which is affixed to beam section 230b. Clevis 514 is fastened to a hinge shaft 516 by a pin 518. Hinge shaft 514 rotates within clevis 512 on ball bearings 520 and 522. A helical torsion spring 524 centered on shaft 516 is affixed at one end to clevis 514, and at the other end to clevis 512 (attachments not illustrated), for urging the hinge into the deployed position. The rate of deployment is controlled by a viscous damper 530 which is mounted on a damper support bracket 534 affixed to clevis 512, and which is coupled to moving shaft 516 by a coupling 532 arranged for taking up any shaft misalignment, such as an Oldham coupling.

Figure 6:
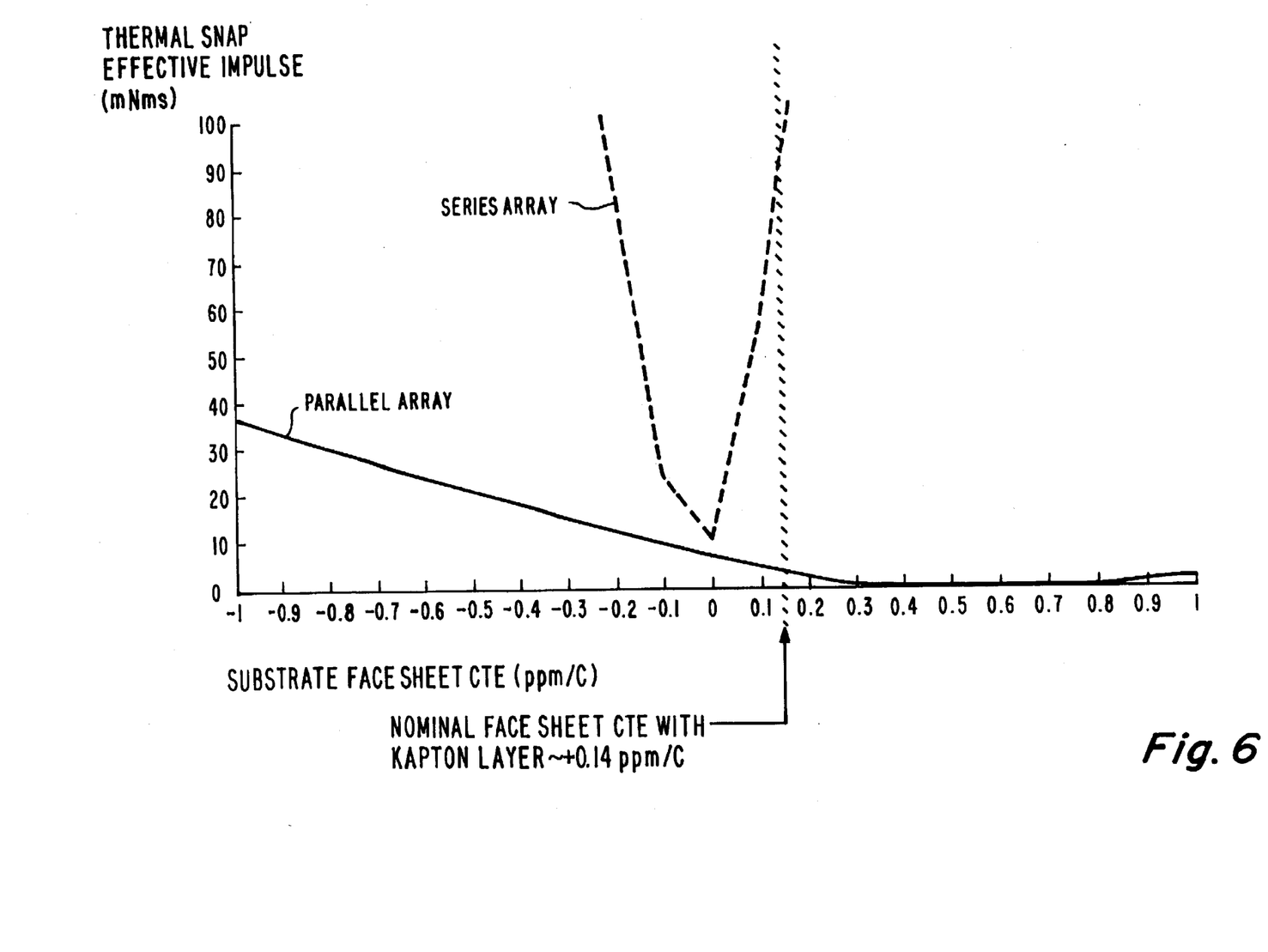
FIG. 6 is a plot of thermal snap impulse versus panel substrate coefficient of thermal expansion for a prior-art arrangement by comparison with a particular embodiment of the invention.

FIG. 6 plots impulse, measured in milli-Newton-meter-seconds, applied to the spacecraft body, as a function of the coefficient of thermal expansion of the face-sheet of the solar cell array support panel or substrate, for an arrangement of twelve panels arranged as in FIGS. 3a, 3b, and 3c, with aluminum honeycomb core panel substrates with facesheets of materials having different CTEs. The impulse which is represented in FIG. 6 results from thermal snap attributable to entering or leaving eclipse. The dash-line plot represents a series-connected prior-art arrangement, while the solid line is for a "parallel" connected arrangement according to the invention. The location of a KAPTON face sheet at ≈+0.14 ppm/°C. is indicated by an arrow. The arrangement according to the invention gives a much lower impulse than the at all illustrated values of CTE.

Figure 7:
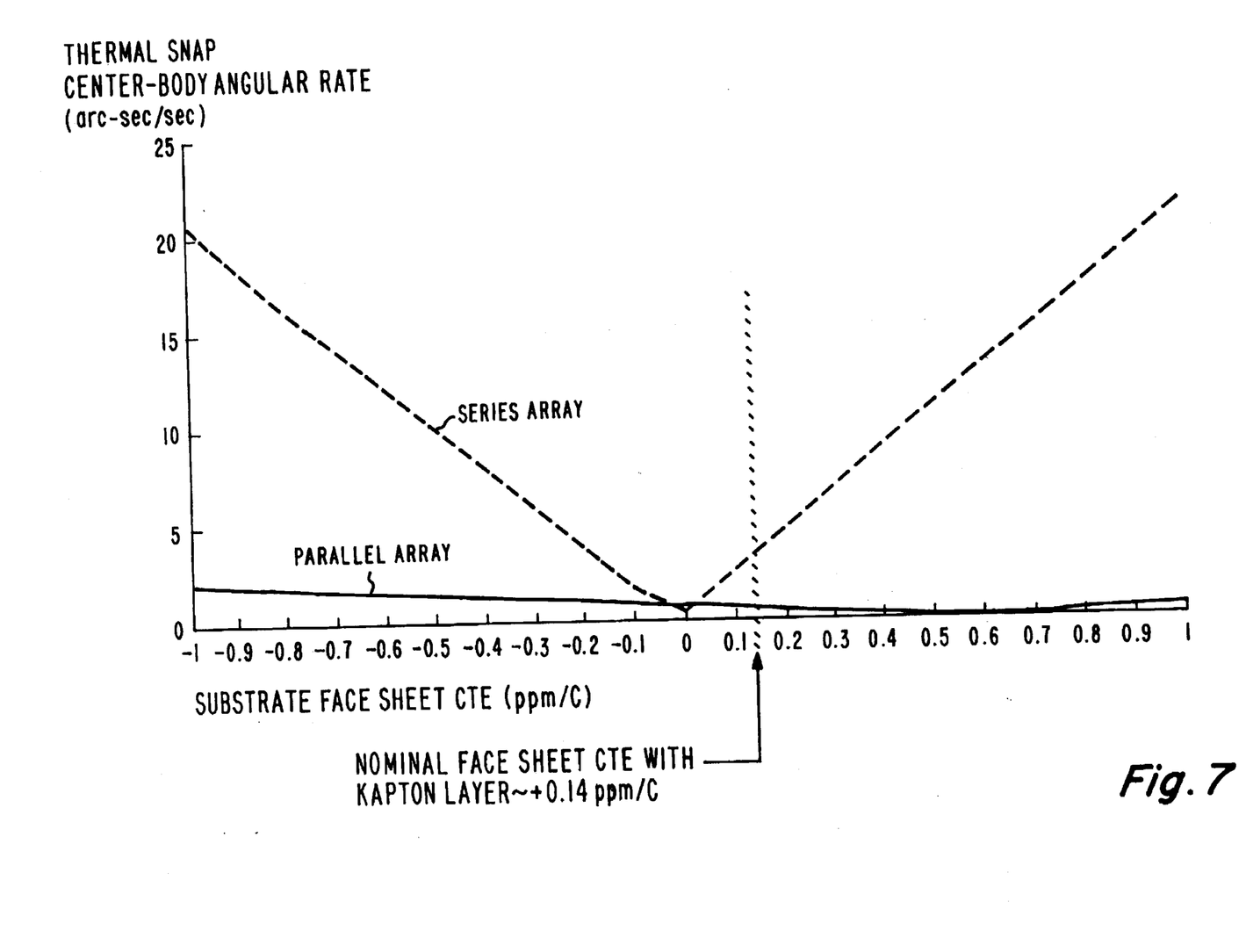
FIG. 7 is a plot of thermal snap spacecraft body angular rate for a prior-art arrangement by comparison with a particular embodiment of the invention.

FIG. 7 plots spacecraft center-body angular rate in arc-seconds/second versus panel or substrate face sheet coefficient of thermal expansion, calculated for a spacecraft with prior-art series-connected solar panels (dash-line) and for an arrangement according to the invention (solid line). The improvement provided by the invention is quite apparent, with the angular rate being lower for all nonzero values of face-sheet CTE.

Figure 8:
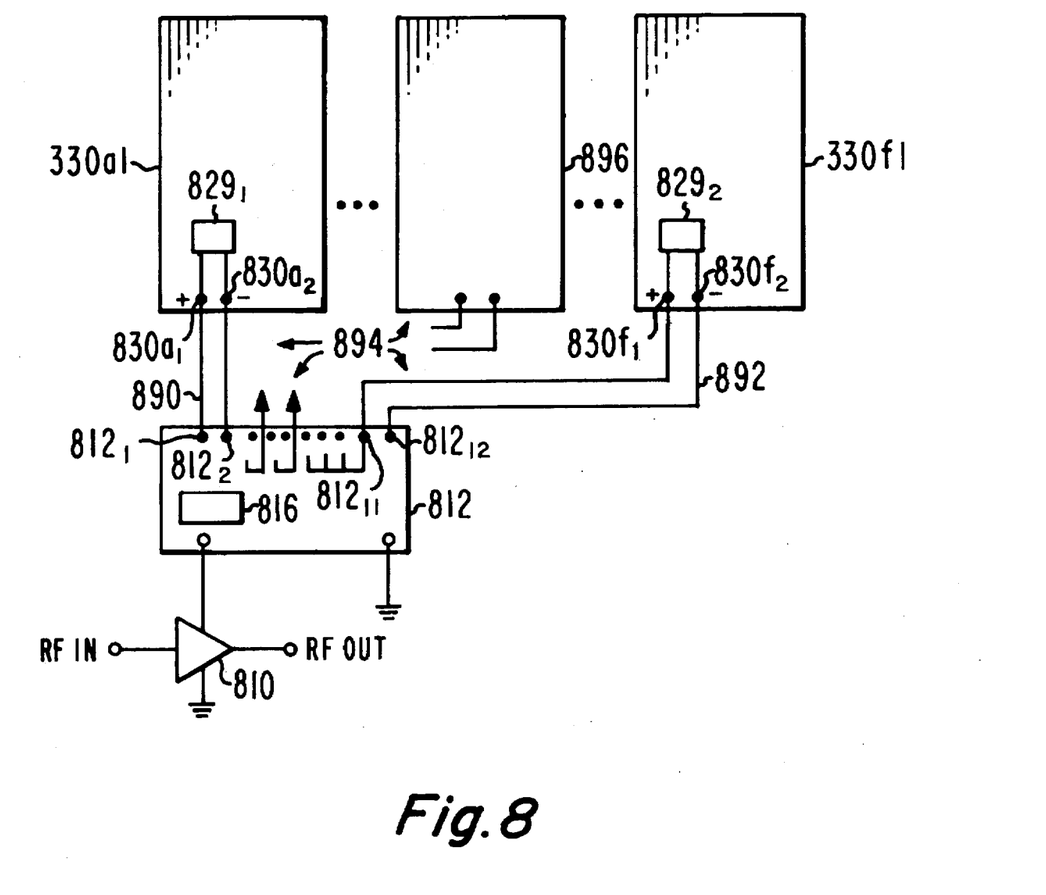
FIG. 8 is a simplified block diagram of a possible electrical connection arrangement for solar panels and the spacecraft.

FIG. 8 is a simplified diagram illustrating electrical connections which may be used in conjunction with a solar panel arrangement according to the invention.

Thus, according to an aspect of the invention, a spacecraft (2100) includes a body (1), and an electrically powered device (810), such as a signal processor or amplifier, associated with the body (1). A power coupler arrangement (812) includes input terminals ($812_1, \ldots 812_{12}$) for accepting electrical energy, and is coupled to the electrically powered device (810), for coupling electrical energy from the input terminals ($812_1, \ldots 812_{12}$) of the power coupler arrangement (812) to the electrically powered device (810) for energization thereof. First ($330a1$) and second ($330f1$) solar panels each include at least one power converter or solar cell ($829_1, \ldots 829_2$) for converting insolation energy into electrical energy, and also include terminals ($830a_1, 830a_2; \ldots;$ $830f_1, 830f_2$) interconnected with the input terminals ($812_1, \ldots 812_{12}$) of the power coupler arrangement (812) for coupling electrical energy from the solar panels ($330a1, \ldots 330f1$) to the power coupler arrangement (812) during those intervals in which the solar panels are insolated. Deployable solar panel supporters (210, 333a, 333b, 333c, 333d, 333e, 333f) are coupled to the body (1). The solar panel supporters (210, 333a, 333b, 333c, 333d, 333e, 333f) include at least first (210) and second (333f) elongated beams, and each of the first (210) and second (333f) elongated beams defines first ($210p; 333fp$) and second ($210d; 333fd$) ends, with the first end ($210p$) of the first elongated beam (210) being affixed to the body (1) in a manner which allows the first elongated beam to be located adjacent to other structure of the spacecraft when in a stowed condition of the first elongated beam (210), and the second end ($210d$) of the first elongated beam (210) being coupled to the first end ($333fp$) of the second elongated beam ($333f$) in a manner which allows the second elongated beam to be located adjacent to other structure of the spacecraft when in a stowed condition of the second elongated beam ($333f$). The first (210) and second ($333f$) elongated beams are deployable from the stowed condition to a deployed condition (FIG. 3a, 3b), in which deployed condition the first (210) and second ($333f$) elongated beams are at least approximately in-line or mutually parallel. The first (210) and second ($333f$) elongated beams of the deployable solar panel supporters (210, 333a, 333b, 333c, 333d, 333e, 333f) are also mechanically coupled to the first ($330a1$) and second ($330f1$) solar panels, respectively, for, in the deployed state, supporting the first ($330a1$) and second ($330f1$) panels in an array in which the panels are substantially parallel. In this arrangement, deformation of the first panel ($330a1$) attributable to thermal effects of the insolation does not affect the deployed orientation of the second panel ($330f1$). The power coupler arrangement includes a power conditioner (816), in one embodiment of the invention, for controlling either the voltage or the current, or both, of the electrical energy. In a particular embodiment, each of the first and second solar panels includes positive and negative terminals at which positive and negative direct voltages are generated by the solar panels during the insolation, and the interconnection with the input terminals of the power coupler arrangement includes (a) a connection (890) between the positive terminal of the first solar panel ($330a1$) and a first one ($812a_1$) of the input terminals of the power coupler arrangement (812), (b) a connection (892) between the negative terminal ($830f2$) of the second solar panel ($330f1$) and a second one ($812_{12}$) of the input terminals of the power coupler arrangement (812), and (c) a series connection arrangement (894) coupled to the negative terminal ($830a_2$) of the first solar panel ($330a1$) and to the positive terminal ($830f_1$) of the second solar panel ($330f1$), for connecting the first ($330a1$) and second ($330f1$) solar panels in electrical series to thereby increase the voltage available from the solar panels to the power coupler arrangement (812). The array series connection arrangement may include solar panels (896) other than the first and second solar panel. The power coupler arrangement includes an arrangement for coupling at least some of the solar panels in an electrical series-parallel connection, for thereby providing a total voltage from the array which is greater than the voltage available from a single one of the solar panels, and also providing the capability of current greater than the current which is available from a single one of the solar panels. In one embodiment, the first elongated beam (333a) is mechanically coupled to the first solar panel (330a1) at a single position along the length of the first elongated beam (333a), whereby any tendency of the first solar panel (330a1) to bend is not communicated to the first elongated beam (333a), or to other panels (330b1, 330c1, 330d1, 330e1, 330b2, 330c2, 330d2, 330e2) along the length of the combined beams. The first (330a1) and second (330f1) solar cell arrays may be supported on support panels made of a material having a coefficient of thermal expansion which is less than that of the material of the first and second elongated beams. The material of the beams may be graphite-reinforced cyanate ester. The material of the support panels may include aluminum structural members.

Other embodiments of the invention will be apparent to those skilled in the art. For example, the power control arrangements provided by arrangement 812 of FIG. 8 may include batteries and bidirectional power converters, as known in the art, for providing power from the batteries or from the solar panels to the electrical devices, depending upon the state of insolation of the panels and the load set by the electrical devices. While one type of shaft alignment coupling has been described for use to couple the hinge shaft to the damper, any suitable type may be used. Other types of hinges may, of course, be used.

What is claimed is:

1. A spacecraft, comprising:

a body;

an electrically powered device associated with said body;

power coupling means including input terminals for accepting electrical energy, and also coupled to said electrically powered device, for coupling said electrical energy from said input terminals of said power coupling means to said electrically powered device for energization thereof;

first and second solar panels including means for converting insolation energy into electrical energy, and also including terminals interconnected with said input terminals of said power coupling means for coupling electrical energy from said solar panels to said coupling means during those intervals in which said solar panels are insolated;

deployable solar panel support means coupled to said body, said solar panel support means including at least first and second elongated beams, each of said first and second elongated beams including first and second ends, said first end of said first elongated beam being affixed to said body in a manner which allows said first elongated beam to be located adjacent to other structure of said spacecraft in a stowed condition of said first elongated beam, said second end of said first elongated beam being coupled to said first end of said second elongated beam in a manner which allows said second elongated beam to be located adjacent to other structure of said spacecraft in a stowed condition of said second elongated beam, said first and second elongated beams being deployable from said stowed condition to a deployed condition in which said first and second elongated beams are at least approximately in-line, said first and second elongated beams of said deployable solar panel support means also being mechanically coupled to said first and second solar panels, respectively, for, in said deployed state, supporting said first and second panels in an array in which said panels are substantially parallel, whereby deformation of said first panel attributable to thermal effects of said insolation does not affect the deployed orientation of said second panel.

2. A spacecraft according to claim 1, wherein said power coupling means comprises power conditioning means for controlling at least one of the voltage and the current of said electrical energy.

3. A spacecraft according to claim 1, wherein each of said first and second solar panels includes positive and negative terminals at which positive and negative direct voltages are generated by said solar panels during said insolation, and wherein said interconnection with said input terminals of said power coupling means comprises (a) a connection between said positive terminal of said first solar panel and a first one of said input terminals of said power coupling means, (b) a connection between said negative terminal of said second solar panel and a second one of said input terminals of said power coupling means, and (c) series connection means coupled to said negative terminal of said first solar panel and to said positive terminal of said second solar panel, for connecting said first and second solar panels in electrical series to thereby increase the voltage available from said solar panels to said power coupling means.

4. A spacecraft according to claim 1, wherein said power coupling means comprises means for coupling at least some of said solar panels in an electrical series-parallel connection, for thereby providing a total voltage from said array which is greater than the voltage available from a single one of said solar panels, and also providing the capability of current greater than the current which is available from a single one of said solar panels.

5. A spacecraft according to claim 1, wherein said first elongated beam is mechanically coupled to said first solar panel at a single position along the length of said first elongated beam, whereby any tendency of said first solar panel to bend is not communicated to said first elongated beam.

6. A spacecraft according to claim 5, wherein said second elongated beam is mechanically coupled to said second solar panel at a single position along the length of said second elongated beam, whereby any tendency of said second solar panel to bend is not communicated to said second elongated beam.

7. A spacecraft according to claim 1, wherein said first and second solar panels are supported on support panels having a coefficient of thermal expansion; and said first and second elongated beams are made from a material having a coefficient of thermal expansion which is lower than that of said support panels.

8. A spacecraft according to claim 7, wherein said material of said first and second elongated beams is a graphite-reinforced cyanate ester.

9. A spacecraft according to claim 8, wherein said support panels include aluminum structural members.

* * * * *